United States Patent

[11] 3,549,123

| [72] | Inventors | Clifford J. Bell;<br>Harry C. Andersen, Muncie, Ind. |
|---|---|---|
| [21] | Appl. No. | 787,391 |
| [22] | Filed | Dec. 27, 1968 |
| [45] | Patented | Dec. 22, 1970 |
| [73] | Assignee | Westinghouse Electric Corporation<br>Pittsburgh, Pa.<br>a corporation of Pennsylvania |

[54] BUTTERFLY VALVE
3 Claims, 8 Drawing Figs.

| [52] | U.S. Cl. | 251/306 |
|---|---|---|
| [51] | Int. Cl. | F16k 1/226 |
| [50] | Field of Search | 251/306—308 |

[56] References Cited

UNITED STATES PATENTS

| 2,657,896 | 11/1953 | Muller | 251/306 |
| 2,847,181 | 8/1958 | Muller | 251/306 |
| 3,118,465 | 1/1964 | Scaramucci | 251/308X |

FOREIGN PATENTS

| 1,127,961 | 8/1956 | France | 251/306 |
| 1,199,685 | 6/1959 | France | 251/306 |

*Primary Examiner*—Henry T. Klinksiek
*Attorneys*—A. T. Stratton, F. E. Browder and D. R. Lackey ABSTRACT: A butterfly valve having a shaft mounted closure member disposed in the fluid passageway of a valve body, which is rotatable from a fluid blocking position to a fluid flow unblocking position. The closure member defines a peripheral groove which includes portions which encircle the shaft at each of the points where the shaft extends outwardly from the closure member. A unitary resilient member is disposed in the peripheral groove of the closure member to provide shaft seals in any position of the closure member, and a passageway seal when the closure member is in the fluid blocking position.

PATENTED DEC 22 1970

WITNESSES
Wm. B. Sellers
James F. Young

INVENTORS
Clifford J. Bell and
Harry C. Andersen
BY
Donald R. Lackey
ATTORNEY 3,549,123

BUTTERFLY VALVE

BACKGROUND OF THE INVENTION

1. Field of The Invention

The invention relates in general to leak-free closure valves, and more specifically to closure valves of the butterfly type.

2. Description of The Prior Art

Electrical power transformers produce heat during their operation, which is removed by circulating oil or other fluid through the core-coil assembly of the transformer, and through external heat exchangers. The external heat exchangers are disconnected from the main transformer tank, after manufacturing and test, prior to shipment, due to the substantial size of power transformers and of their heat exchangers. Shut off valves disposed in the piping between the transformer and heat exchanger are closed prior to the removal of the heat exchangers, to prevent leakage of the cooling liquid.

Shut off valves of the prior art, used for this purpose, have generally been of the flapper type, and have several disadvantages. For example, if the valve is operated while the coolant pumps are running, the flapper disc may be damaged to the point where it will not provide an efficient seal, making it more difficult and time consuming to remove or install the heat exchanger apparatus. The packing around the operating shaft of the flapper-type valve has not proven to be leak free, especially after being subjected to hot transformer oil, allowing objectionable seepage around the operating shaft. Also, when closing the flapper type valve, it is possible to overtighten the locking bolt, which may cause failure of some of the parts. Some of the internal hardware of the valve may become loose, making the valve inoperative, and the loose parts may even fall into the transformer tank. Further, the flapper-type valve is costly to manufacture due to the relatively large number of parts and machining required, while providing a valve construction which at best results in some restriction in the flow of the coolant, adding to the pressure drop in the coolant loop. It is especially important to reduce the pressure drop presented by the valve in systems which depend upon the thermal siphon effect for circulation of the coolant.

Therefore, it would be desirable to provide a new and improved valve which may be used for a shutoff valve between a power transformer and its associated heat exchanger apparatus, which has relatively few operating parts, is relatively inexpensive to manufacture, is leakproof, operable between fluid blocking and fluid flow unblocking positions without danger of overtightening, and which presents very little restriction to the flow of the cooling liquid when it is in its fluid unblocking position.

SUMMARY OF THE INVENTION

Briefly, the present invention is a new and improved valve of the butterfly type, having a valve body which defines a flow passageway, and a shaft-mounted closure member disposed in the flow passageway which is rotatable from a fluid blocking to a fluid flow unblocking position. The closure member defines a peripheral recess or groove which includes first and second spaced, parallel, substantially circular portions each disposed to encircle the shaft, and two spaced substantially semicircular portions disposed in a plane perpendicular to the planes of the first and second circular portions, with the ends of the semicircular portions joining the first and second circular portions. A unitary resilient member is disposed in the peripheral groove of the closure member, with the portions of the resilient member which are disposed in the first and second circular portions providing an interference fit with the wall of the flow passageway, regardless of the position of the closure member, to provide shaft seals, and with the portions of the resilient member disposed in the semicircular portions of the groove providing an interference fit with the wall of the fluid passageway when the closure member is in its fluid blocking position, to seal the flow passageway. Actuating and locking means are connected to an external extension of the operating shaft, to enable the closure member to be rotated, and to lock the closure member in the desired position.

BRIEF DESCRIPTION OF THE DRAWINGS

Further advantages and uses of the invention will become more apparent when considered in view of the following detailed description and drawings, in which.

DESCRIPTION OF PREFERRED EMBODIMENTS

Figure 2:
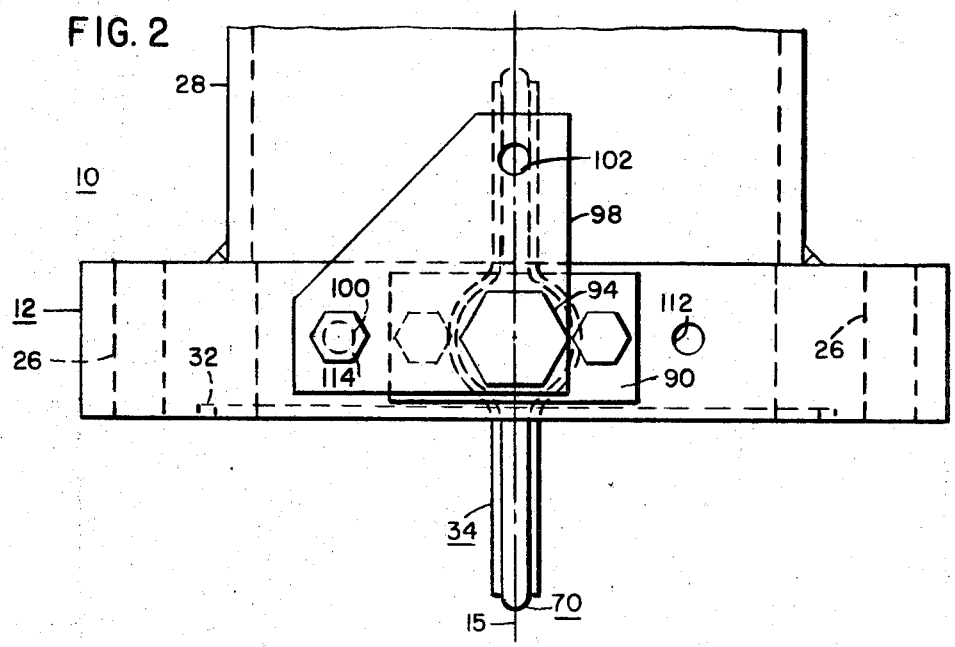
FIG. 2 is a plan view of the butterfly valve shown in FIG. 1.
Figure 1:
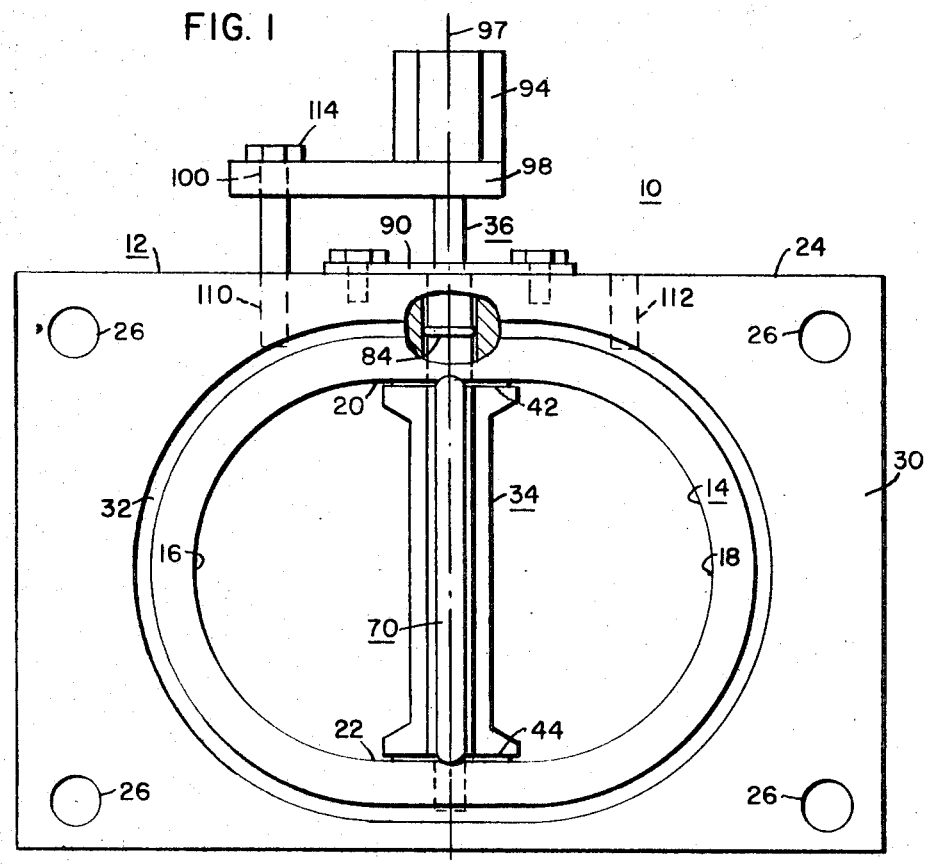
FIG. 1 is an elevational view of a butterfly valve, constructed according to the teachings of the invention, illustrated with its closure member in the fluid flow unblocking position.

Referring now to the drawings, and FIGS. 1 and 2 in particular, there is shown elevational and plan views, respectively, of a butterfly valve 10 constructed according to the teachings of the invention. Butterfly valve 10 includes a valve body 12, which may be constructed of any suitable metallic material, such as steel plate, or a steel forging. The valve body 12 defines a fluid flow passageway 14, having a longitudinal axis 15. The cross section of the flow passageway is substantially elliptical, having first and second spaced semicircular portions 16 and 18, respectively, and first and second spaced flat portions 20 and 22, respectively, which join the ends of the semicircular portions.

The valve body 12 has a peripheral flange 24, with a plurality of fastening apertures 26 being disposed through the flange 24. The valve body may be disposed between two flanged pipe sections, with one of the flanged pipe sections being connected to the tank of a transformer, and the other to heat exchanger apparatus; or, as shown in FIG. 2, one side of the valve body 12 may have a pipe section 28 secured thereto, such as by welding, with the opening of the pipe section being in communication with the flow passageway 14 of the valve body 12, and with the fastening apertures 26 being used, in this instance, to secure the valve body 12 to a flanged pipe section which may be associated with the heat exchanger apparatus. The pipe section 28 may be connected to the power transformer. The face 30 of the flanged section 24 of the valve body 12, which is to be joined to the face of a similarly dimensioned flange, has a continuous groove 32 disposed therein which encircles the flow passageway, adapted to receive a resilient gasket member sized to be compressed when the valve body is connected to another flange section, to seal the resulting joint.

A closure member or butterfly disc 34 is mounted in the flow passageway 14 of the valve body 12 on a shaft 36 which is rotatably supported by the valve body 12, on an axis 97 which is perpendicular to the flow axis 15 of passageway 14. The butterfly disc 34 is rotatable between the fluid flow unblocking position shown in FIG. 1, in which position the butterfly disc 34 provides very little restriction to the flow of cooling fluid, to the fluid blocking position shown in FIG. 3.

Figure 3:
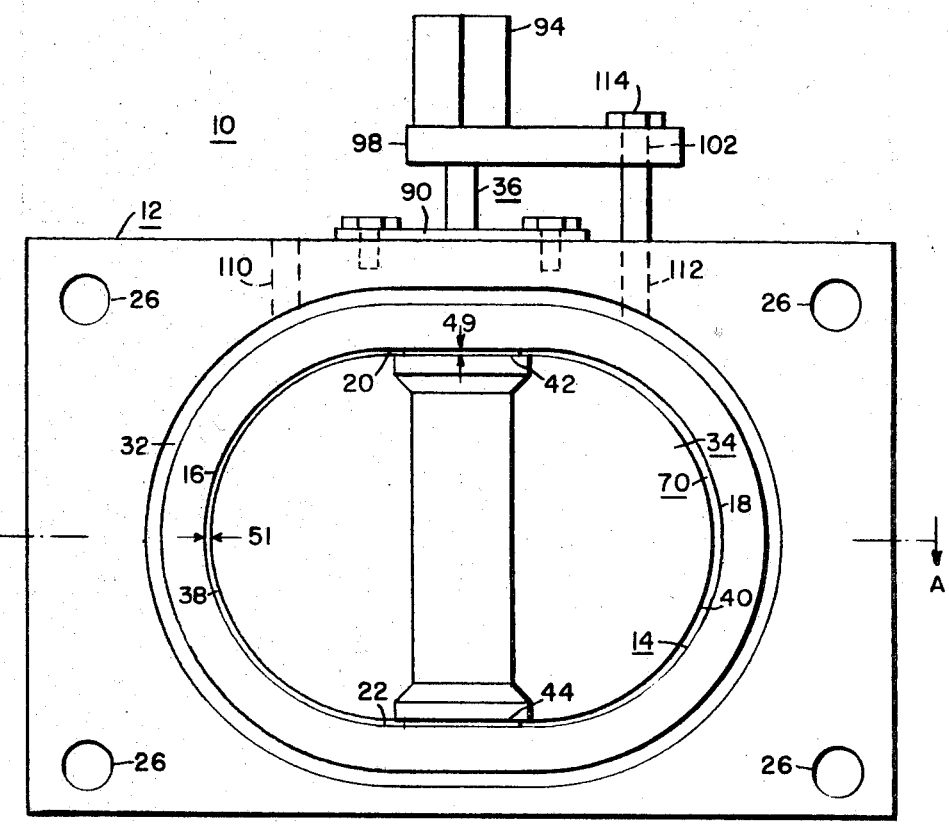
FIG. 3 is an elevational view of the butterfly valve shown in FIG. 1, with the closure member being illustrated in the fluid blocking position.
Figure 3A:
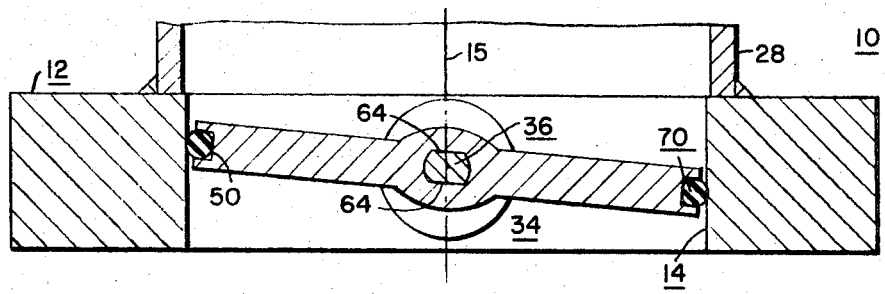
FIG. 3A is a sectional view of the butterfly valve shown in FIG. 3, taken along the line A–A.

FIG. 3 is an elevational view of butterfly valve 10, similar to FIG. 1, except for the different positions of the butterfly disc 34. The butterfly disc 34 may be die cast of aluminum to size, or it may be formed of any other suitable material by any suitable method. The cross-sectional configuration of the butterfly disc 34, as illustrated more clearly in FIG. 3, has first and second semicircular portions 38 and 40, which may have a radius slightly less than the radius of the first and second circular portions 16 and 18, respectively, of passageway 14, or the semicircular portions 38 and 40 may be sized to provide a slight interference fit with the passageway 14. Disc 34 also has first and second flat portions 42 and 44 which are spaced from the flat portions 20 and 22, respectively, of the passageway 14. Thus, when the butterfly disc 34 is positioned within the passageway 14, as shown in FIG. 3, there is a small predetermined clearance 49 between the flat portions 42 and 44, and the flat portions 20 and 22, respectively, of the passageway 14. The clearance 51 between the semicircular portions 38 and 40 of the disc 34 and circular portions 16 and 18, respectively, of the passageway 14 may be the same as the clearance 49, as illustrated in FIG. 3; or, as shown in FIG. 3A, which is a sectional view of the butterfly valve 10 taken along the line A–A of FIG. 3, there may be an interference fit between the curved portions of the disc 34 and the passageway 14, when the disc nears a perpendicular position across the passageway, for a purpose which will be hereinafter explained.

Figure 4:
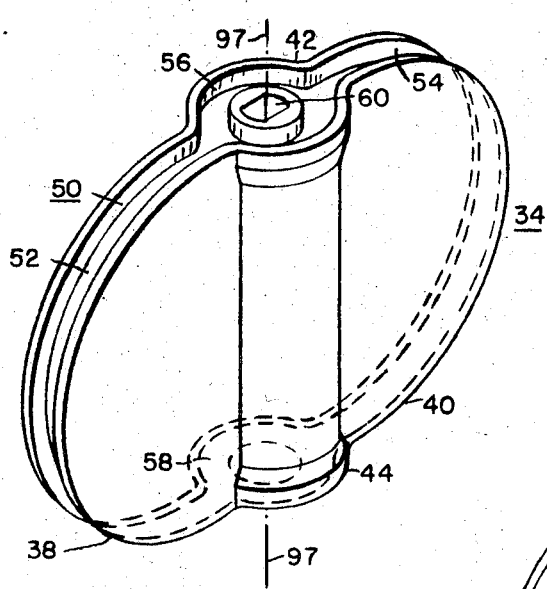
FIG. 4 is a perspective view of the closure member of the butterfly valve shown in FIG. 1.

The closure member or butterfly disc 34 defines a peripheral recess, groove or channel 50, shown most clearly in the perspective view of the closure member 34 in FIG. 4, with the groove 50 being a single channel in the curved or semicircular portions 38 and 40, and a circular channel in each of the flat portions 42 and 44. More specifically, as shown in FIG. 4, groove 50 includes channels 52 and 54 disposed in the outer periphery of curved portions 38 and 40, and circular channels 56 and 58 disposed in the flat portions 42 and 44. The grooves 52 and 54 disposed in the semicircular portions of the closure member 34 intersect the circular grooves 56 and 58, providing a continuous peripheral groove in disc 34 which includes two flat circular portions 56 and 58 which are parallel with one another, and which are joined by semicircular grooves 52 and 54, which are disposed in a plane perpendicular to the planes of the circular grooves 56 and 58. The groove 50, is therefore a composite groove including a portion 52 which intersects the circular portion 56, dividing into two portions, returning to a single groove portion 54, and again dividing into two grooves at the circular portion 58, and returns to a single groove in portion 52.

A shaft opening 60 is provided through the butterfly disc 34, having an axis 97. The axis 97 passes through the center of both of the circular portions 56 and 58 of the composite groove 50. The shaft opening 60 is substantially elliptical in cross section, which cooperates with the flats 64 provided on the shaft 36, which are shown most clearly in the elevational view of shaft 36 in FIG. 6, to enable the butterfly disc 34 to turn with the shaft 36, without requiring additional bolts or pins, or other means for locking the two parts together.

The butterfly disc 34 includes a resilient member 70, which is disposed in the accommodating composite recess or groove 50, with the groove 50 and resilient member 70 being sized to allow the resilient member 70 to expand into the groove cross-sectional area when the resilient member 70 is compressed. Resilient member 70 is a new and improved unitary O-ring assembly, which includes four connected segments or sections, including a circular section or portion 72 which fits into portion 56 of groove 50, a circular portion 74 which fits into portion 58 of groove 50, a semicircular portion 76 which connects portions 72 and 74, and which fits into portion 52 of groove 50, and a semicircular portion 78 which connects circular portions 72 and 74, and which fits into portion 54 of groove 50.

Resilient member 70 should be formed of a relatively soft material, which has a low affinity for the transformer coolant used, and which will retain its strength, flexibility and resilience when subjected to the transformer coolant, across the complete temperature cycling range of the coolant. For example, a suitable material would be nitrile rubber or a nitrile silicone rubber.

Resilient member 70 preferably has a circular cross section, sized such that it extends outwardly from the groove 50 for a dimension which exceeds the metallic clearance dimension 49 between the flat portions of the valve body 12 and the closure member or butterfly disc 34, and the dimension 51, if any, between the curved portions of the disc 34 and the valve body. Thus, there will be an interference fit between each of the circular portions 72 and 74 of resilient member 70 and the flat portions 20 and 22 of the passageway 14, respectively, which compresses portions 72 and 74 to provide shaft seals. Portion 74 seals the shaft 36 where it leaves or extends outwardly from the flat portion 44 of the butterfly disc 34, preventing the liquid in the valve 10 from being forced upwardly between the shaft 36 and the opening 60 in the butterfly disc 34, and portion 72 seals the shaft 36 where it leaves the flat portion 42 of the butterfly disc 34, also preventing the liquid disposed in the valve passageway from being forced upwardly between the shaft 36 and the shaft opening 60 in the butterfly disc. The interference fit between portions 72 and 74 of the resilient member 70 and the passageway 14 is maintained regardless of the position of the butterfly disc 34.

The remaining portions 76 and 78 of resilient member 70 provide an interference fit with curved portions 16 and 18 of the passageway 14, when the butterfly disc 34 is in the fluid flow blocking position shown in FIG. 3. Thus, when the valve 10 is closed, the resilient member 70 is uniformly compressed over all of its segments, providing a leakproof seal in the fluid passageway, and leakproof shaft seals about shaft 36. When the valve 10 is opened, the leakproof shaft seals are maintained, while the interference fit is removed between the curved portions 76 and 78 of resilient member 70, as portions 76 and 78 clear the passageway 14 and move into the adjoining connected pipe sections. Thus, there is less drag on the turning of the butterfly disc 34, once the butterfly disc is turned away from its fluid blocking position.

As shown in FIG. 3, if there is a clearance 51 between the curved portions of the disc 34 and the passageway 14, the disc 34 may be rotated until its major plane is perpendicular to the direction of fluid flow, represented by axis 15 in FIG. 2. If the resilient member 70 should take a set after many years of service, however, there would be no adjustment in the amount that the resilient member 70 is compressed, and the butterfly valve 10 may leak in its fluid blocking position. Therefore, the embodiment of the invention shown in FIG. 3A may be preferable, wherein there is a slight interference fit between the metallic curved portions 38 and 40 of the disc 34 and metallic passageway 14, which allows the disc 34 to only approach a position of 90° to the fluid flow direction. In this embodiment, the position of disc 34 in its blocking position is adjustable, enabling an effective seal to be obtained even when the resilient member 70 has taken a set. Thus, when the resilient member 70 is new and highly resilient, a seal may be obtained with little compression of the resilient member, and the disc 34 may be positioned with a relatively large angle between its major plane and a plane perpendicular to the direction of fluid flow. As the resilient member 70 ages, a seal may still be obtained by reducing the angle between the major plane, which increases the compression of the resilient member 70.

Figure 6:
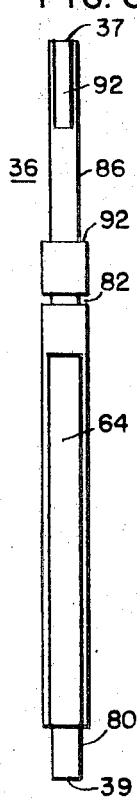
FIG. 6 is an elevational view of the operating shaft of the butterfly valve shown in FIG. 1.

The shaft 36, shown in elevation in FIG. 6, which has upper and lower ends 37 and 39, respectively, may have a circular bearing surface 80 disposed adjacent its lower end 39, sized to enter a blind circular opening in the flat portion 22 of the passageway 14, which allows the shaft to rotate in the opening without binding, and also without excessive side play. The next adjacent portion of the shaft 36, includes a substantially elliptically shaped section, i.e., such as an initially round section having flats 64 disposed on opposite sides thereof, with the longitudinal length of the flats being the same dimension as the length of the shaft opening in the butterfly disc 34, and sized to allow the butterfly disc 34 to be disposed within the fluid passageway 14, and the shaft 36 to be inserted through a shaft opening in the valve body and then into the butterfly disc 34, with the fit between the shaft 36 and the opening in the butterfly disc 34 being a slight press fit.

To provide additional protection against seepage of the liquid along the shaft 36, in the event that some of the liquid coolant should find its way past the shaft seals provided by portions 72 and 74 of the resilient O-ring member 70, shaft 36 may have a circumferential groove 82 disposed therein for receiving an O-ring 84, as shown in FIG. 1, which will be depressed by the wall of the shaft opening in the valve body 12.

Shaft 36 has a smaller diameter portion 86 near its upper end 37, which extends through a shaft retainer plate 90. The shoulder 92 in the shaft provided by the smaller diameter 86 is held by plate 90 to prevent upward movement of the shaft. The opening in the shaft retainer plate 90 is sized to provide an upper bearing point for the shaft 36.

The extreme upper end of shaft 36 may have flats 92 disposed thereon, which cooperate with actuating means 94, for enabling the shaft 36 and its associated butterfly disc 34 to be turned between the fluid blocking and the fluid flow unblocking positions. Actuating means 94 may be a suitably sized nut member, which enables the shaft to be turned with a box or end wrench.

Actuating means 94 may have suitable indicating and locking means associated therewith, which will indicate the position of the closure member or butterfly disc 34 within the fluid passageway, and lock the actuating means and butterfly disc in the selected position. As illustrated in FIGS. 1, 2 and 3, the indicating means may be a plate 98 secured to actuating means 94, which has first and second openings 100 and 102 disposed therein. Openings 100 and 102 are located such that a line drawn through the center line of opening 100 and the center line of shaft 36, would be perpendicular to a line drawn through the center line of opening 102 and the center line of shaft 36. Blind openings 110 and 112 are disposed in the upper surface of valve body 12, located such that the center line of opening 110 is aligned with the center line of opening 100 in plate 98 when the butterfly disc is in its fluid flow unblocking position, as shown in FIG. 1. Thus, a pin or bolt 114 may be inserted through opening 100, and dropped or threaded into opening 110, which will prevent the rotational movement of the actuating means 94. The center line of opening 110 in the valve body is located such that it will be aligned with the center line of opening 102 in plate 98 when the butterfly disc 34 is in the fluid blocking position shown in FIG. 3. Thus, the bolt 114 may be removed from opening 100, prior to turning the valve, and placed in opening 102, after the valve has been moved to the fluid flow blocking position.

If the butterfly valve 10 has an adjustable fluid blocking position, as shown in FIG. 3A, the blind holes 110 and 112 may be eliminated, and bolt 114 may threadably engage plate 98, thus when the disc 34 is in the desired position, the bolt 114 may be turned against the top of the valve body 12 to secure the position of the disc. For example, the end of bolt 114 may be pointed, and a wearplate containing a plurality of closely spaced grooves may be disposed on the valve body 12, to accommodate the positioning and locking of the bolt 114.

Figure 7:
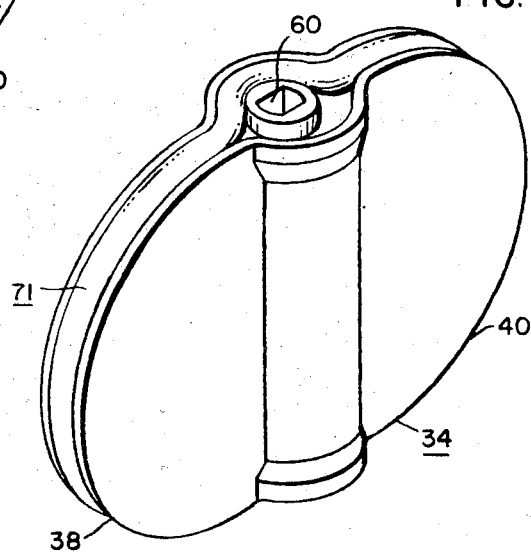
FIG. 7 is a perspective view of a closure member and resilient sealing member constructed according to another embodiment of the invention.
Figure 5:
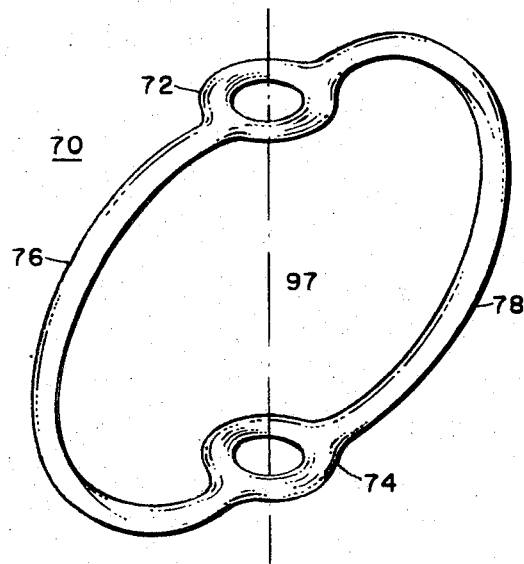
FIG. 5 is a perspective view of the resilient sealing member which is disposed in an accommodating peripheral recess of the closure member shown in FIG. 4.

While the composite resilient member 70 shown in FIG. 5 is preferred, it is also possible to obtain an efficient seal by using a simple O-ring having a single loop. This embodiment of the invention is shown in FIG. 7, which is a perspective view of disc 34, having a single loop O-ring 71 disposed in the recess 50. It is important that the O-ring 71 be disposed in that portion of the circular recess 56 and 58 which faces the transformer side of the valve when the butterfly valve 10 is in its fluid blocking position, in order to provide a shaft seal.

A butterfly valve constructed according to the teachings of the invention was tested in 90° C. transformer oil, and was found to hold 50 p.s.i.g., without leakage through the fluid flow passageway, and without seepage along the operating shaft.

In summary, there has been disclosed a new and improved butterfly valve which has particular application in providing a leak free closure between a power transformer and its associated heat exchanger apparatus, but which may be used for any other suitable application. The only moving internal parts of the disclosed butterfly valve are a butterfly disc and its associated operating shaft, neither of which may become loose and inoperative, or become separated and fall into the transformer tank. Further, the butterfly disc cannot be damaged by closing it with the coolant pumps operating, nor can the butterfly disc be overtightened. The relatively few moving parts and the absence of a requirement for precision machining on the parts, enables the valve to be manufactured for substantially less than the prior art flapper type valve, and yet the disclosed butterfly valve is very reliable, and will maintain its reliability over an extended temperature range while passing or blocking transformer coolant liquid. The single unitary resilient O-ring structure disclosed in one embodiment of the invention, containing segments or portions for performing the functions of continuously sealing the operating shaft, and for sealing the fluid passageway when the valve is in the fluid blocking position, enables the butterfly disc to be a simple die cast part, and it eliminates the need for seat rings in the passageway of the valve body. Further, the closure member 34 presents a very small restriction in the coolant flow path, resulting in very little pressure drop in the system.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim:

1. A butterfly valve, comprising:
   a valve body having an inner wall which defines a fluid passageway having first and second spaced curved wall portions, joined by first and second flat wall portions, said first and second curved wall portions having semicircular cross-sectional configurations which would form a complete circle if placed together;
   a rotatable shaft extending across and perpendicular to the straight, flat wall portions of said fluid passageway;
   a closure member mounted on said shaft, rotatable from a fluid blocking position to a fluid flow unblocking position;
   said enclosure member having an outer configuration which includes first and second spaced semicircular portions, the ends of which are joined by first and second flat portions, said closure member defining a continuous groove about its outer periphery, which includes first and second semicircular portions disposed in the first and second spaced semicircular portions of said closure member, respectively, and first and second substantially circular portions disposed in the first and second substantially circular portions disposed in the first and second flat portions of said closure member, respectively, which connect with the ends of the semicircular portions, said first and second circular portions encircling said shaft adjacent the points at which the shaft extends outwardly from the closure member; and
   a unitary resilient member disposed in the portions of the groove defined by said closure member which include the first and second semicircular portions and at least one-half of each of the first and second circular portions, the portions of said resilient member disposed in the first and second circular portions of the groove having an interference fit with the first and second flat wall portions of the fluid passageway, respectively, regardless of the position of said closure member, and with the remaining portions of said resilient member having an interference fit with the first and second curved wall portions of the fluid passageway when said closure member is in its fluid blocking position, to seal the fluid passageway through said valve body.

2. The butterfly valve of claim 1 wherein the first and second curved portions of the closure member and the first and second curved portions of fluid passageway have an interference fit, respectively.

3. The butterfly valve of claim 1 wherein the unitary resilient member has two spaced semicircular portions disposed in the same plane, which are disposed in the first and second semicircular portions of the groove, respectively, with their adjacent ends being joined by first and second circular portions which are perpendicular to the plane of the semicircular portions, and which are disposed in the first and second circular portions, respectively, of the groove.